US012674463B2

(12) United States Patent
Kawata

(10) Patent No.: US 12,674,463 B2
(45) Date of Patent: Jul. 7, 2026

(54) ELECTRIC COMPRESSOR

(71) Applicant: SANDEN CORPORATION, Gunma (JP)

(72) Inventor: Junki Kawata, Gunma (JP)

(73) Assignee: SANDEN CORPORATION, Gunma (JP)

( * ) Notice: Subject to any disclaimer, the term of this patent is extended or adjusted under 35 U.S.C. 154(b) by 57 days.

(21) Appl. No.: 18/843,392

(22) PCT Filed: Feb. 16, 2023

(86) PCT No.: PCT/JP2023/005383
§ 371 (c)(1),
(2) Date: Sep. 3, 2024

(87) PCT Pub. No.: WO2023/176279
PCT Pub. Date: Sep. 21, 2023

(65) Prior Publication Data
US 2025/0172157 A1 May 29, 2025

(30) Foreign Application Priority Data

Mar. 16, 2022 (JP) ................................. 2022-041723

(51) Int. Cl.
*F04D 27/00* (2006.01)
*F04B 35/04* (2006.01)
(Continued)

(52) U.S. Cl.
CPC ............ *F04D 27/004* (2013.01); *F04B 35/04* (2013.01); *F04B 49/06* (2013.01); *F04B 49/065* (2013.01);
(Continued)

(58) Field of Classification Search
CPC .............. F04B 49/20; F04B 2203/0209; F04B 49/065; F04B 2203/0202; F04B 35/04;
(Continued)

(56) References Cited

U.S. PATENT DOCUMENTS

| | | | | |
|---|---|---|---|---|
| 6,462,492 | B1 * | 10/2002 | Sakamoto | H02P 6/18 |
| | | | | 318/400.32 |
| 7,259,533 | B2 * | 8/2007 | Yang | H02P 29/02 |
| | | | | 318/434 |

(Continued)

FOREIGN PATENT DOCUMENTS

| | | |
|---|---|---|
| JP | 2000-287485 A | 10/2000 |
| JP | 2020-139461 A | 9/2020 |
| JP | 2021-016034 A | 2/2021 |

OTHER PUBLICATIONS

International Search Report mailed on Apr. 11, 2023 for PCT/JP2023/005383.

*Primary Examiner* — Peter J Bertheaud
(74) *Attorney, Agent, or Firm* — Rankin, Hill & Clark LLP

(57) ABSTRACT

An electric compressor includes a control unit configured to control drive of a motor. The control unit executes: synchronous deceleration control that is performed on conditions that a stop command for the motor has been inputted from the outside and that the number of rotations of a rotor is equal to or less than a predetermined first number of rotations and is greater than a predetermined second number of rotations, and decreases the number of rotations under forced synchronous control based on a current having a predetermined target current value; and stop control that is performed on condition that the number of rotations has reached the second number of rotations under the synchronous deceleration control, and stops rotation of the rotor under braking control that controls drive of predetermined (Continued)

switching element IGBTs of a plurality of switching elements in such a manner as to apply a load to the motor.

8 Claims, 8 Drawing Sheets

(51) Int. Cl.

| | |
|---|---|
| *F04B 49/06* | (2006.01) |
| *F04B 49/20* | (2006.01) |
| *F04D 25/06* | (2006.01) |
| *F25B 1/04* | (2006.01) |
| *F25B 31/02* | (2006.01) |
| *F25B 49/02* | (2006.01) |
| *H02P 6/18* | (2016.01) |
| *H02P 21/18* | (2016.01) |
| *H02P 21/22* | (2016.01) |
| *H02P 21/24* | (2016.01) |
| *H02P 21/36* | (2016.01) |
| *H02P 23/14* | (2006.01) |

(52) U.S. Cl.
CPC .............. *F04B 49/20* (2013.01); *F04D 25/06* (2013.01); *F25B 1/04* (2013.01); *F25B 31/026* (2013.01); *F25B 49/025* (2013.01); *H02P 6/18* (2013.01); *H02P 21/18* (2016.02); *H02P 21/22* (2016.02); *H02P 21/24* (2016.02); *H02P 21/36* (2016.02); *H02P 23/14* (2013.01); *F04B 2203/0201* (2013.01); *F04B 2203/0202* (2013.01); *F04B 2203/0209* (2013.01); *F25B 2700/151* (2013.01); *H02P 2207/05* (2013.01)

(58) Field of Classification Search
CPC .............. F04B 49/06; F04B 2203/0201; F25B 49/025; F25B 2600/021; F25B 1/04; F25B 2700/151; F25B 31/026; H02P 21/22; H02P 21/18; H02P 6/18; H02P 2207/05; H02P 23/14; H02P 21/24; H02P 21/36; F04D 27/004; F04D 25/06
See application file for complete search history.

(56) References Cited

U.S. PATENT DOCUMENTS

| | | | | |
|---|---|---|---|---|
| 10,250,174 B2 * | 4/2019 | Sakai | .................... | H02P 23/009 |
| 2020/0325890 A1 * | 10/2020 | Okubo | .................... | F04B 35/06 |
| 2021/0013817 A1 | 1/2021 | Ohashi | | |
| 2021/0242815 A1 * | 8/2021 | Hongyo | .............. | H02P 21/0089 |

* cited by examiner

*FIG. 9*

ELECTRIC COMPRESSOR 100 (CONTROL UNIT MC)

STEP 1  ( START
(RECEIVE MOTOR STOP COMMAND) )

STEP 2  ROTOR M2
PRESENT NUMBER OF
ROTATIONS ≤ N1?  —NO→  SENSORLESS
DECELERATION
CONTROL

STEP 3

|YES

STEP 4  PRESENT NUMBER OF
ROTATIONS > N2?  —NO→

|YES

STEP 5  SYNCHRONOUS DECELERATION CONTROL

STEP 6  DETERMINE TARGET CURRENT VALUE
(COMMAND VALUE) AND VALUE OF TARGET
NUMBER OF ROTATIONS (COMMAND VALUE)

STEP 7  CONDITION 1: PRESENT
NUMBER OF ROTATIONS ≤ N2,
CONDITION 2: ELAPSED TIME Tc SINCE STOP
COMMAND ≥ Tc1, IS AT LEAST ONE OF
CONDITIONS 1 AND 2
SATISFIED?  —NO→

|YES

STEP 8  STOP CONTROL (IGBT Q1 TO Q6)

STEP 9  STOP CONTROL
DURATION Td ≥ Td1?  —NO→

|YES

STEP 10  END STOP CONTROL

STEP 11  ( END )  (STOPPED STATE)

ELECTRIC COMPRESSOR

TECHNICAL FIELD

The present invention relates to an electric compressor that is used to compress a refrigerant in, for example, vehicle air-conditioning systems and includes an inverter and a motor.

BACKGROUND ART

An electric compressor including an inverter motor uses an inverter to convert direct current power from a direct current power supply into three-phase alternating current power and supplies the power to a motor for driving the compressor. In this electric compressor, it is generally known that when the compressor stops, the direction of a compression mechanism thereof is reversed by a pressure difference between a suction pressure region and a discharge pressure region of a refrigerant in the compression mechanism, and abnormal noise may be caused due to the reverse rotation.

An electric compressor described in Patent Literature 1 is known as an electric compressor in which it is encouraged to prevent reverse rotation. The electric compressor includes a control unit that, when the compressor stops, executes braking control as a prevention measure against reverse rotation and generation of abnormal noise. Specifically, when an operation stop command is inputted from the outside, the control unit of the electric compressor shuts off the power to a plurality of switching elements configuring an inverter (a motor drive circuit), rotates a rotor of a motor by inertia, and then executes braking control to encourage the prevention of reverse rotation. In general, sensorless control, that is, control that increases or reduces the number of rotations (rotational speed) of the rotor of the motor while estimating the position of the rotor on the basis of the current value of a current flowing from the motor drive circuit to the motor is often adopted in an electric compressor including an inverter motor.

CITATION LIST

Patent Literature

Patent Literature 1: JP-A-2000-287485

SUMMARY OF INVENTION

Problems to be Solved by Invention

Incidentally, since electric vehicles have been widespread in recent years, the level of demand for quietness for electric compressors installed in vehicles has increased. In this respect, when the rotor is rotating by inertia between the input of the operation stop command and the start of braking control in the known electric compressor described in Patent Literature 1, sliding components in the compression mechanism collide with each other, which may cause abnormal noise and vibration. As a result, it may cause a decrease in quietness, and there is room for improvement. In addition, the inventor of the present application has confirmed through earnest efforts that the higher the number of rotations of the motor (rotor) at the time of the input of the operation stop command, the higher the levels of abnormal noise and vibration during inertial rotation. Therefore, if it is encouraged to improve quietness upon stop of operation of the known electric compressor, for example, it is conceivable to execute braking control after reducing the rotational speed of the motor under the above-mentioned sensorless control.

However, in the electric compressor adopting sensorless control, a minimum operable number of rotations for sensorless control is specified. In other words, it is difficult in sensorless control to control the number of rotations (rotational speed) of the rotor with the number of rotations less than the minimum operable number of rotations. Hence, the level of improvement in quietness results in depending on the minimum operable number of rotations for sensorless control, and a measure against it may be required.

In view of such circumstances, an object of the present invention is to provide an electric compressor that can improve quietness after input of a stop command from the outside more than before.

Solution to Problems

According to one aspect of the present invention, an electric compressor is provided which includes: a compression mechanism configured to compress and discharge a refrigerant; a motor configured to drive the compression mechanism; a motor drive circuit connected between the motor and a direct current power supply, the motor drive circuit including a plurality of switching elements; and a control unit configured to control drive of the motor including sensorless control that increases or reduces the number of rotations of a rotor of the motor while estimating the position of the rotor on the basis of the current value of a current flowing from the motor drive circuit to the motor. The control unit of the electric compressor executes synchronous deceleration control and stop control. The synchronous deceleration control is performed on conditions that a stop command for the motor has been inputted from the outside and that the number of rotations of the rotor is equal to or less than a predetermined first number of rotations and is greater than a predetermined second number of rotations, and decreases the number of rotations under forced synchronous control based on a current having a predetermined target current value. The stop control is performed on condition that the number of rotations has reached the second number of rotations under the synchronous deceleration control, and stops rotation of the rotor under braking control that controls drive of a predetermined switching element of the plurality of switching elements in such a manner as to apply a load to the motor.

Effects of Invention

In the electric compressor according to the one aspect of the present invention, the control unit executes the synchronous deceleration control that is performed on conditions that the stop command for the motor has been inputted from the outside and that the number of rotations of the rotor is equal to or less than the predetermined first number of rotations and is greater than the predetermined second number of rotations, and decreases the number of rotations under the forced synchronous control based on the current having the predetermined target current value. Therefore, for example, even if the number of rotations of the rotor at the time of, for example, the input of the stop command is less than the minimum operable number of rotations for the sensorless control, the rotor is caused to decrease in the number of rotations (reduce in speed) under the synchronous deceleration control without the rotor rotating by inertia, simply by presetting the first number of rotations at a value that agrees with the minimum operable number of rotations. As a result, quietness upon stop of operation is improved more than before. Moreover, the control unit stops the rotation of the rotor under the stop control after the number of rotations reaches the second number of rotations under the synchronous deceleration control. Consequently, the reverse rotation of the rotor (the compression mechanism) and abnormal noise caused by the reverse rotation can be quickly prevented or hindered.

In this manner, according to the one aspect of the present invention, it is possible to provide an electric compressor that can improve quietness after input of a stop command from the outside more than before.

BRIEF DESCRIPTION OF DRAWINGS

FIG. 9 is a flowchart for explaining a schematic flow of the control operation by the control unit.

DESCRIPTION OF EMBODIMENTS

Figure 1:
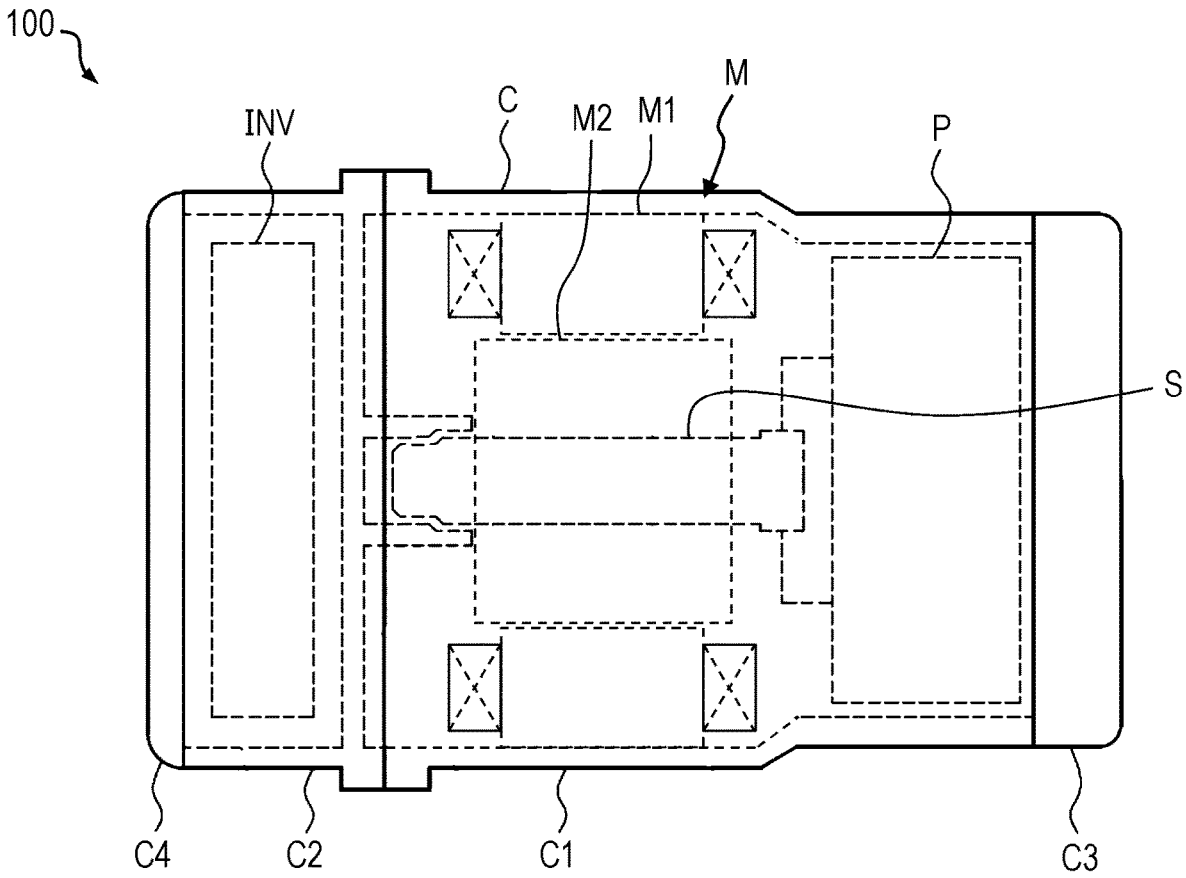
FIG. 1 is a diagram illustrating a schematic appearance of an electric compressor according to one embodiment of the present invention.
Figure 2:
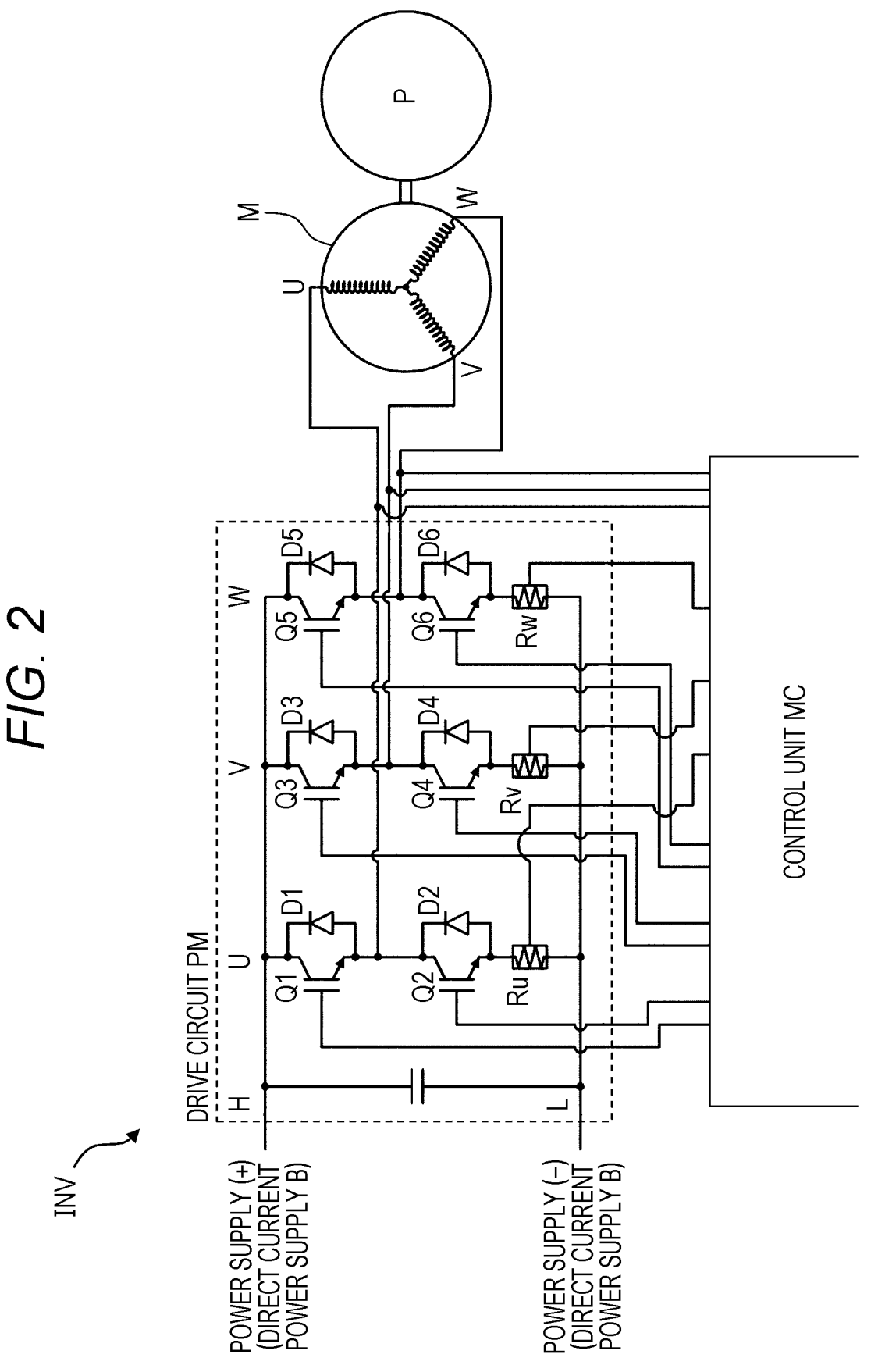
FIG. 2 is a block diagram including a motor drive circuit and a control unit of the electric compressor.

An embodiment of the present invention is described in detail hereinafter with reference to the accompanying drawings. FIG. 1 is a diagram illustrating a schematic of the appearance of an electric compressor 100 according to one embodiment of the present invention, and FIG. 2 is a block diagram including an inverter INV having a motor drive circuit PM and a control unit MC, which are described below, of the electric compressor 100.

The electric compressor 100 in the embodiment is incorporated in, for example, a refrigerant circuit of a vehicle air-conditioning system installed in a vehicle, and takes in, compresses, and discharges a refrigerant of the vehicle air-conditioning system. The electric compressor 100 is what is called an inverter-integrated electric compressor, and includes a housing C, a compression mechanism P that compresses and discharges the refrigerant by rotation, a motor M that drives the compression mechanism P, and the inverter INV having the drive circuit PM and the control unit MC to supply power to the motor M.

The housing C accommodates the compression mechanism P, the motor M, and the inverter INV. In the embodiment, the housing C is configured, including a main housing C1, an inverter housing C2, and lid members C3 and C4. They (C1 to C4) are integrally fastened with, for example, bolts. The main housing C1 accommodates the compression mechanism P and the motor M, and the inverter housing C2 accommodates the inverter INV. The interior of the housing C is divided into a first space that stores the compression mechanism P and the motor M, and a second space that accommodates the inverter INV.

In the embodiment, the housing C is fixed to the vehicle. In other words, the electric compressor 100 includes the housing C that accommodates the compression mechanism P, the motor M, and the inverter INV (the drive circuit PM and the control unit MC) and that is fixed to the vehicle.

The compression mechanism P is, for example, a scroll compression mechanism having a fixed scroll and an orbiting scroll, which are engaged with each other, and is coupled to a drive shaft X. The orbiting scroll is coupled to the drive shaft X in such a manner as to be capable of revolving in orbit around the axis of the fixed scroll, and a compression chamber is formed between the orbiting scroll and the fixed scroll. The orbiting scroll revolves in orbit, so that the volume of the compression chamber changes. A low-pressure refrigerant taken into the main housing C1 from the low side of the refrigerant circuit through an unillustrated inlet is guided to the central portion of the compression mechanism P while being compressed in the compression chamber. The refrigerant that has been guided to the central portion of the compression mechanism P is discharged to the high side of the refrigerant circuit through an unillustrated outlet.

The motor M is, for example, a synchronous motor including a three-phase brushless motor. The motor M includes a stator M1 having a stator coil, and a rotor M2 having a permanent magnet. The stator coil includes a U-phase coil, a V-phase coil, and a W-phase coil, which are connected in a star connection. The stator M1 is fixed to an inner peripheral surface of the main housing C1. The rotor M2 is formed in a cylindrical shape, and is fixed to the drive shaft X with the drive shaft X inserted through a hollow portion of the rotor M2. In other words, the rotor M2 is integrated with the drive shaft X and rotates integrally with the drive shaft X.

The inverter INV converts direct current power from an unillustrated external direct current power supply B such as a battery into three-phase alternating current power and supplies the three-phase alternating current power to the motor M. The inverter INV includes, as a circuit configuration thereof, the control unit MC that controls drive of the motor drive circuit (power module) PM and the motor M.

The motor drive circuit PM is connected between the motor M and the direct current power supply B and includes the same insulated-gate bipolar transistors (hereinafter referred to as "IGBTs") Q1 to Q6 as a plurality of switching elements. The control unit MC controls the drive (on/off) of each of the IGBTs Q1 to Q6. Therefore, direct current voltage is converted into alternating current voltage to be supplied to the motor M. The IGBTs Q1 to Q6 are divided into a U-phase arm, a V-phase arm, and a W-phase arm, which are connected in parallel with one another between a high-voltage line H (that is, a high voltage-side line) and a ground line L (that is, a ground-side line) of the direct current power supply B.

The U-phase arm includes two IGBTs (Q1 and Q2) connected in series between the high-voltage line H and the ground line L. The two IGBTs (Q1 and Q2) are connected in anti-parallel to diodes D1 and D2, respectively. Similarly, the V-phase arm includes two IGBTs (Q3 and Q4), and the two IGBTs (Q3 and Q4) are connected in anti-parallel to diodes D3 and D4, respectively. The W-phase arm includes two IGBTs (Q5 and Q6), and the two IGBTs (Q5 and Q6) are connected in anti-parallel to diodes D5 and D6, respectively.

The IGBTs (Q1, Q3, and Q5) are high-side elements (that is, power supply-side elements). The IGBTs (Q2, Q4, and Q6) are low-side elements (that is, ground-side elements). The IGBTs (Q1 and Q2), the IGBTs (Q3 and Q4), and the IGBTs (Q5 and Q6) are the same phase pairs of a high-side element and a low-side element, respectively. Moreover, the midpoint of each of the U-phase arm, the V-phase arm, and the W-phase arm is connected to one end of its corresponding phase coil of the motor M. Shunt resistors Ru, Rv, and Rw for detecting currents flowing through their respective phases are provided on the ground line L side of the IGBTs (Q2, Q4, and Q6) that are the low-side elements.

The control unit MC controls the drive of the motor M. For example, commands from the outside, such as a vehicle air-conditioning control device that controls the entire vehicle air-conditioning system are inputted into the control unit MC. The air-conditioning control device outputs (transmits), to the control unit MC, commands such as an operation command for the motor M (the electric compressor 100) and a stop command for the motor M. The control unit MC includes a computer such as a microcontroller and stores programs that execute various types of control in response to commands from the outside (the air-conditioning control device).

Here, the electric compressor 100 adopts sensorless control that increases or reduces the number of rotations (also referred to as the rotational speed) of the rotor M2 of the motor M while estimating the position of the rotor M2 on the basis of the current value of a current flowing from the motor drive circuit PM to the motor M without using a rotation angle sensor that detects the position of the rotor M2. This sensorless control is executed by the control unit MC.

In the embodiment, the control unit MC is configured in such a manner as to be capable of executing: motor drive control in which sensorless control drives the motor M in response to a command from the outside; sensorless deceleration control in which sensorless control causes the rotor M2 to decrease in the number of rotations (reduce in speed); synchronous deceleration control in which forced synchronous control based on a current having a predetermined target current value (that is, a command current value) causes the rotor M2 to decrease in the number of rotations (reduce in speed); and stop control (also referred to as braking control) for stopping the rotation of the rotor M2 (the compression mechanism P).

In other words, when an operation command for the motor M from the outside (the air-conditioning control device) is inputted into the control unit MC (when the control unit MC receives the operation command), the control unit MC executes motor drive control on the basis of the operation command from the outside. When a stop command for the motor M is inputted from the outside into the control unit MC (when the control unit MC receives the stop command), the control unit MC autonomously executes sensorless deceleration control, forced synchronous control, and stop control as appropriate. Sensorless control is adopted as control methods for both motor drive control and sensorless deceleration control, and forced synchronous control (also referred to as forced commutation control or open-loop control) is adopted as a control method for synchronous deceleration control. In motor drive control, the control unit MC increases or reduces the number of rotations of the rotor M2 in response to a command from the outside, and in sensorless deceleration control and synchronous deceleration control, the control unit MC autonomously and forcibly causes the rotor M2 to decrease in the number of rotations (reduce in speed).

Moreover, at least one of the electric compressor 100 and the vehicle air-conditioning control device includes pressure sensors that detect a pressure (Ps) in a suction pressure region and a pressure (Pd) in a discharge pressure region of the refrigerant. It is configured in such a manner that signals indicating detected values of the pressure (Pd) and the pressure (Ps) by pressure sensors installed in the electric compressor 100, or pressure sensors installed in the vehicle, are inputted into the control unit MC.

Figure 3:
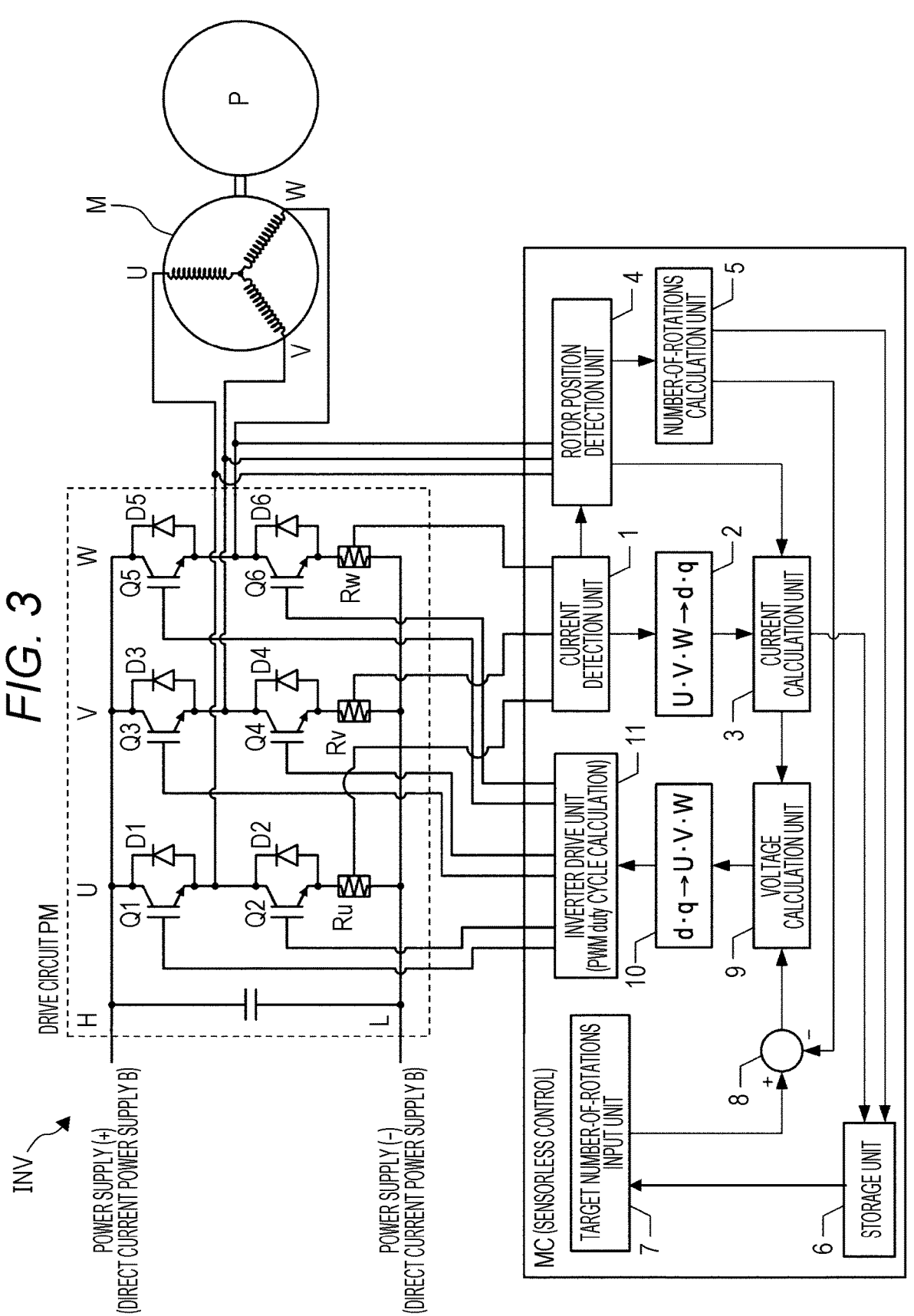
FIG. 3 is a block diagram illustrating a configuration example of the control unit at the time of execution of motor drive control and sensorless deceleration control.

FIG. 3 is a block diagram illustrating a configuration example of the control unit MC at the time of execution of sensorless control (motor drive control and sensorless deceleration control).

In the control unit MC, a current detection unit 1 measures voltages applied to the shunt resistors Ru, Rv, and Rw to detect a U-phase current, a V-phase current, and a W-phase current. A first conversion calculation unit 2 calculates rotor coordinate system values on the basis of the detected phase current values, and inputs the calculated values to a current calculation unit 3. A rotor position detection unit 4 calculates, for example, the phase and electrical angle of the current and the induced voltage on the basis of the detected applied voltages and the phase currents by the current detection unit 1, and estimates the rotor position. On the basis of the rotor position ($\theta$m) detected by the rotor position detection unit 4, a number-of-rotations calculation unit 5 calculates the number of rotations (rotational speed) of the rotor M2 from, for example, $d\theta$m/dt. The present current value of the motor M calculated by the current calculation unit 3 and the value of the present number of rotations (present rotational speed value) of the rotor M2 calculated by the number-of-rotations calculation unit 5 are inputted into and stored (or updated) in a storage unit 6 that uses non-volatile memory such as EEPROM.

In motor drive control, an addition unit 8 performs a computation from the value of the number of rotations by the number-of-rotations calculation unit 5 and the value of a target number of rotations (also referred to as a speed command value) inputted from the outside into a target number-of-rotations input unit 7, and the computed value of the target number of rotations is inputted into a voltage calculation unit 9. The value of the target number of rotations inputted into the target number-of-rotations input unit 7 is a command value inputted from the outside (for example, the air-conditioning control device).

In sensorless deceleration control, the control unit MC reads, for example, a predetermined first number of rotations N1 preset and stored in the storage unit 6 as the value of the target number of rotations, and inputs the first number of rotations N1 into the target number-of-rotations input unit 7. The addition unit 8 then performs a computation from the value of the number of rotations by the number-of-rotations calculation unit 5 and the value of the target number of rotations (the first number of rotations N1) from the target number-of-rotations input unit 7, and the computed value of the target number of rotations is inputted into the voltage calculation unit 9.

In motor drive control and sensorless deceleration control, the voltage calculation unit 9 calculates a voltage value on which a PWM signal is based, on the basis of the current value by the current calculation unit 3 and the value of the target number of rotations by the addition unit 8, and inputs the calculated value into a second conversion calculation unit 10. The calculated value by the voltage calculation unit 9 is converted by the second conversion calculation unit 10 from the rotor coordinate system values into a U-phase, a V-phase, and a W-phase value. An inverter drive unit 11 generates a PWM signal on the basis of the phase values obtained by the second conversion calculation unit 10, and the motor drive circuit PM is controlled on the basis of the PWM signal from the inverter drive unit 11.

In motor drive control, the rotor M2 is caused to increase or reduce in the number of rotations to the number of rotations in accordance with the value of the target number of rotations from the outside. In sensorless deceleration control, it is possible to cause the rotor M2 to reduce in the number of rotations (reduce in speed) to the predetermined first number of rotations N1.

The first number of rotations N1 is greater than zero. In addition, the first number of rotations N1 is set at, for example, a minimum operable number of rotations for sensorless control in the electric compressor 100. The minimum operable number of rotations is specified at a predetermined value of, for example, approximately 500 rpm to 600 rpm in many cases, depending on, for example, the characteristics of the motor M. The number of rotations that agrees with the specified value is set as the first number of rotations N1. In the embodiment, although not particularly limited, it is assumed that the minimum operable number of rotations is 600 rpm, and the first number of rotations N1 is also set at 600 rpm.

Figure 4:
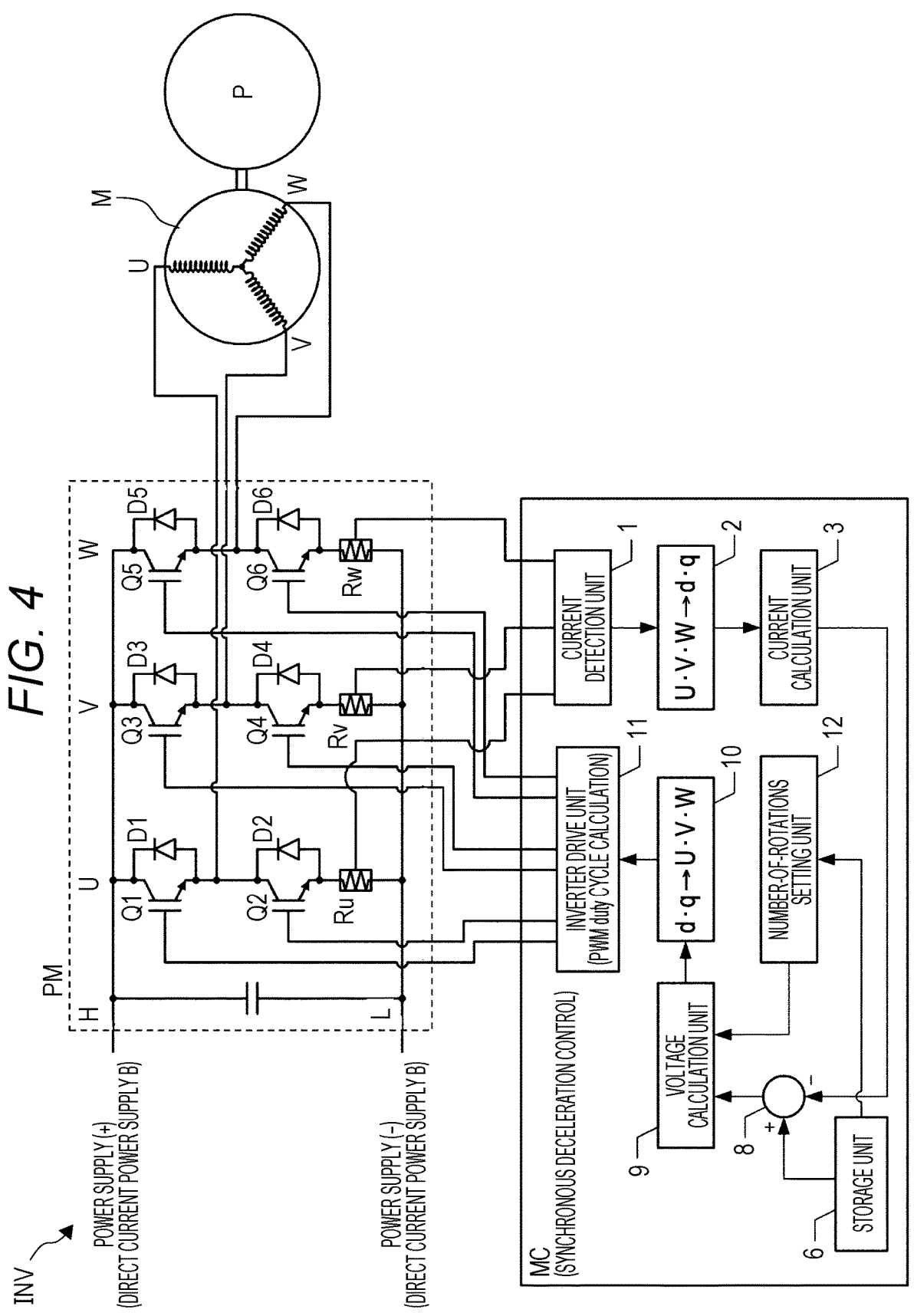
FIG. 4 is a block diagram illustrating a configuration example of the control unit at the time of execution of synchronous deceleration control.

FIG. 4 is a block diagram illustrating a configuration example of the control unit MC at the time of execution of synchronous deceleration control. In synchronous deceleration control, the position of the rotor M2 is not detected, and the rotor M2 is forced to rotate.

In the control unit MC that executes synchronous deceleration control, for example, the stored current value and map data are read from the storage unit 6 according to control examples described below, and are used. These stored values are provided to the voltage calculation unit 9 via the addition unit 8 according to the control examples described below. According to the control examples described below, a number-of-rotations setting unit 12 keeps providing the value of a target number of rotations that reduces at constant deceleration or gradually decreasing deceleration to the voltage calculation unit 9 until the predetermined second number of rotations N2 at which a transition is made to stop control is reached. The voltage calculation unit 9 calculates a voltage value on which a PWM signal is based, on the basis of the current value by the addition unit 8 and the value of the target number of rotations by the number-of-rotations setting unit 12, and the second conversion calculation unit 10 converts the calculated value from the rotor coordinate system values into a U-phase, a V-phase, and a W-phase value. The inverter drive unit 11 generates a PWM signal on the basis of the phase values obtained by the second conversion calculation unit 10, and the motor drive circuit PM is controlled on the basis of the PWM signal from the inverter drive unit 11.

In synchronous deceleration control, the rotor M2 is caused to reduce in the number of rotations (reduce in speed) to the preset predetermined second number of rotations N2.

The second number of rotations N2 is less than the first number of rotations N1 and is greater than zero. In the embodiment, the second number of rotations N2 is set at a value greater than the number of rotations corresponding to a resonance frequency (that is, a natural frequency) of a vehicle part including a part of the vehicle to which the housing C is fixed. The resonance frequency of the vehicle part (a bracket or a frame of the vehicle) is in a low frequency band around, for example, 1 Hz in many cases. Therefore, the second number of rotations N2 is set at a value greater than approximately 60 rpm. In the embodiment, although not particularly limited, it is assumed that the second number of rotations N2 is set at 120 rpm.

In synchronous deceleration control, the current detection unit 1 detects phase currents as in sensorless control, and the first conversion calculation unit 2 calculates rotor coordinate system values on the basis of the detected phase current values, and inputs the calculated values into the current calculation unit 3. The addition unit 8 performs a computation from the present current value of the motor M calculated by the current calculation unit 3 on the basis of the calculated values from the first conversion calculation unit 2 and the stored current value by the storage unit 6, and the present current value is fed back.

In stop control (braking control), after bringing all the IGBTs Q1 to Q6 to an off state (power shutoff state), the control unit MC stops the rotation of the rotor M2 (the orbital revolution motion of the orbiting scroll of the compression mechanism P) under braking control that controls the drive of predetermined switching elements (hereinafter referred to as the braking control-purpose elements as appropriate) among the IGBTs Q1 to Q6 in such a manner as to apply a load to the motor M. In other words, when synchronous deceleration control transitions to stop control as described below, firstly the control unit MC controls the drive of the IGBTs Q1 to Q6 under stop control in such a manner as to bring all the IGBTs Q1 to Q6 to the off state. Consequently, the rotor M2 (the compression mechanism P) enters an inertial rotation state. The control unit MC performs the braking control that controls the drive of the braking control-purpose elements in a state where the rotor M2 is rotating by inertia to apply a load to the motor M. As a result, a braking force against the inertial rotation of the rotor M2 is generated, and the rotation of the rotor M2 stops. The magnitude of the braking force to be generated by the braking control is determined on the basis of, for example, the characteristics of the compression mechanism P and the motor M, and an on period of the braking control-purpose elements. Note that, for example, the specifics of stop control are described in detail below.

Here, in the control unit MC, synchronous deceleration control is performed on conditions that a stop command for the motor M has been inputted from the outside and that the number of rotations of the rotor M2 is equal to or less than the predetermined first number of rotations N1 (here, the minimum operable number of rotations for sensorless control) and is greater than the predetermined second number of rotations N2, and stop control is performed on condition that the number of rotations has reached the second number of rotations N2 under synchronous deceleration control. In addition, in the control unit MC, sensorless deceleration control is executed prior to synchronous deceleration control if the number of rotations of the rotor M2 is greater than the first number of rotations N1 when a stop command for the motor M is inputted from the outside.

Figure 5:
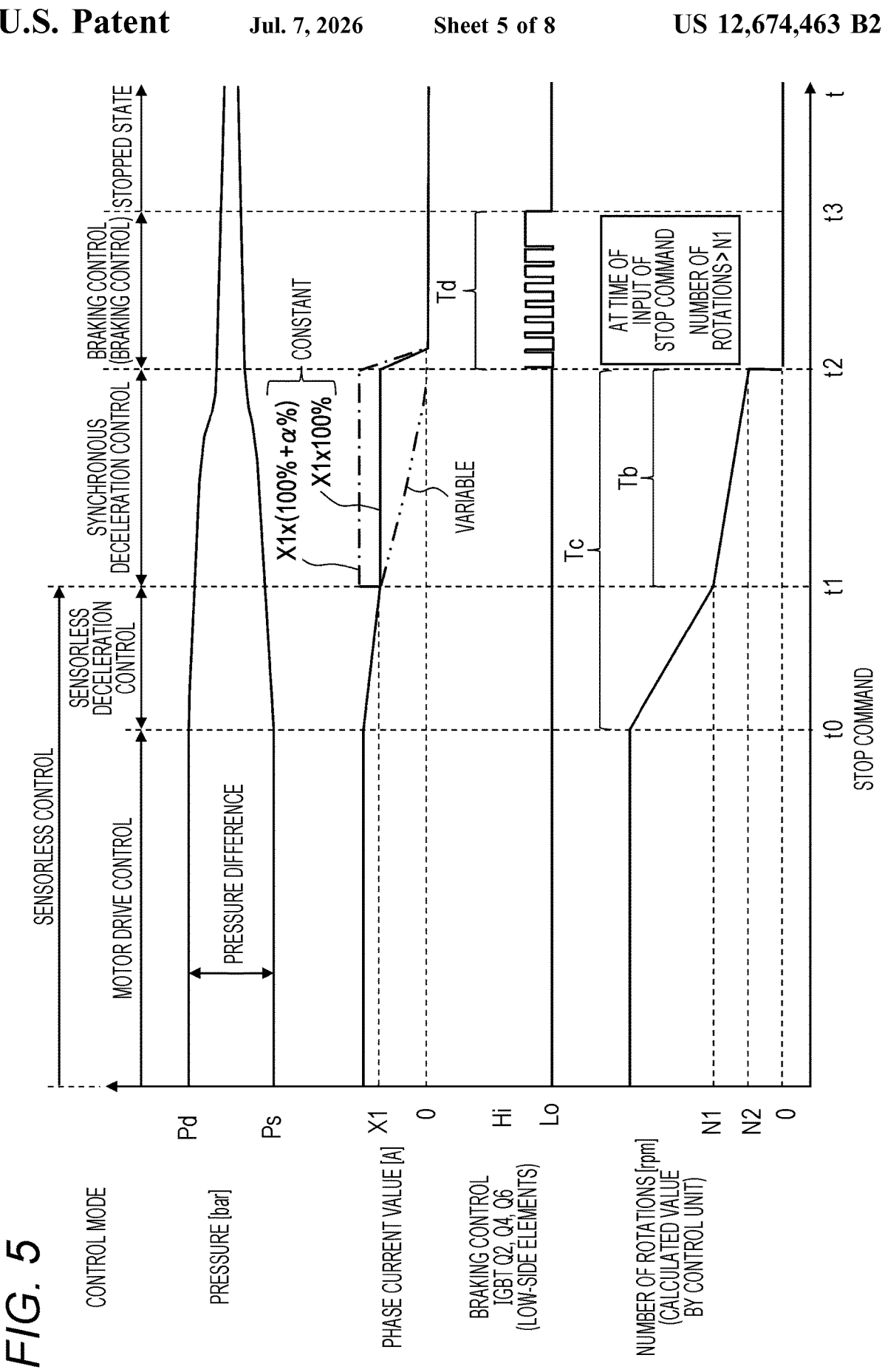
FIG. 5 is a diagram illustrating an example of a timing chart of the control operation of the control unit.
Figure 6:
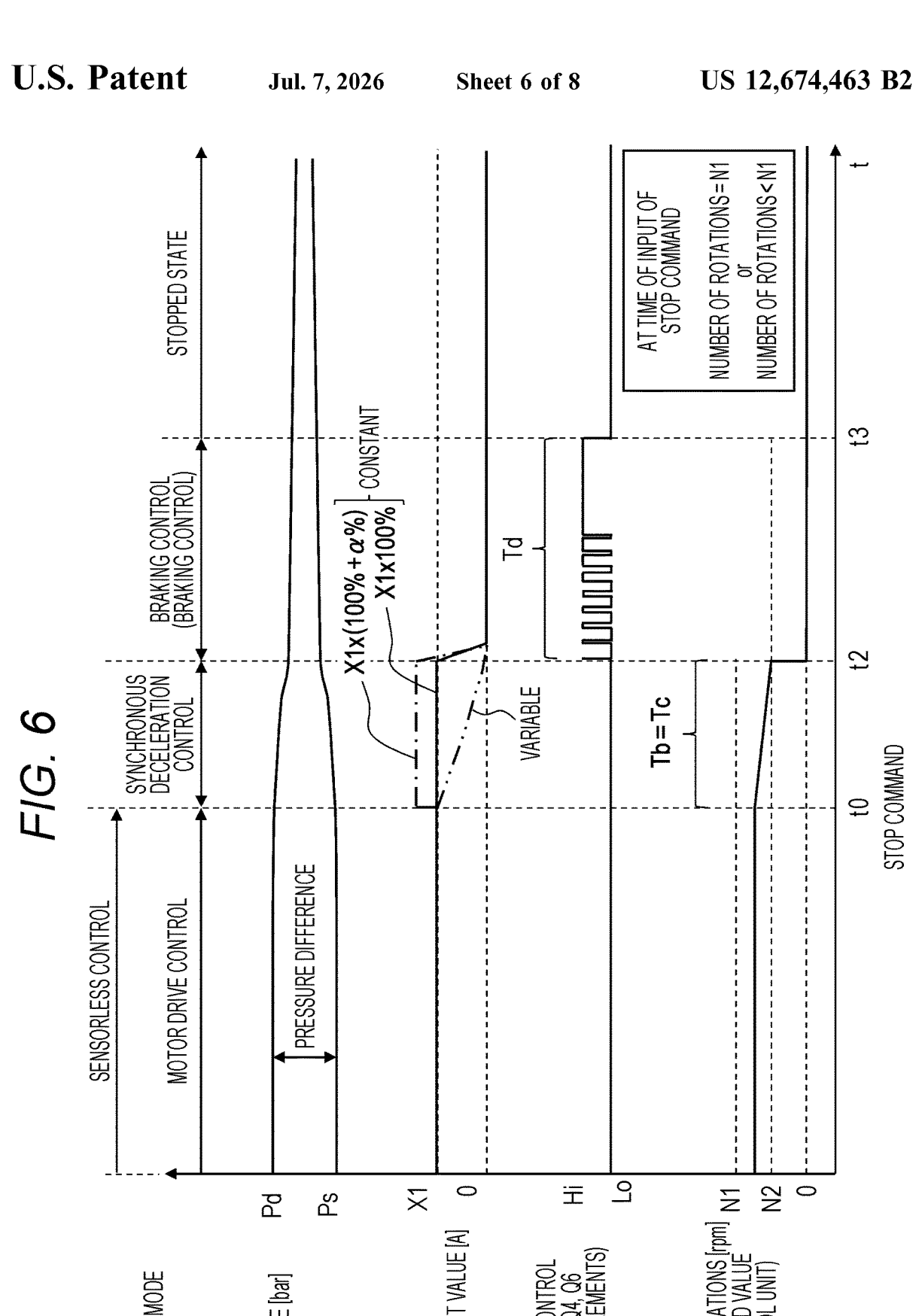
FIG. 6 is a diagram illustrating another example of the timing chart.

FIGS. 5 and 6 are diagrams illustrating examples of a timing chart of the control operation of the control unit MC. FIG. 5 illustrates an example of a case where the number of rotations at the time of the input of a stop command is greater than the first number of rotations N1, and FIG. 6 illustrates an example of a case where the number of rotations at the time of the input of a stop command is equal to or less than the first number of rotations N1 (less than the first number of rotations N1 in the drawing) and is greater than the second number of rotations N2. Note that specifically the number of rotations at the time of the input of a stop command is less than the first number of rotations N1 in FIG. 6, but similar control is performed even if the number of rotations at the time of the input of a stop command agrees with the first number of rotations N1.

With reference to FIG. 5, if the number of rotations at the time of the input of a stop command is greater than the first number of rotations N1, firstly the control unit MC decreases the number of rotations (reduce speed) under sensorless deceleration control. When the number of rotations subsequently reaches the first number of rotations N1, the control unit MC transitions to synchronous deceleration control, and decreases the number of rotations (reduces speed) under synchronous deceleration control. Furthermore, when the number of rotations reaches the second number of rotations N2, the control unit MC transitions to stop control, and stops the rotation of the rotor M2. Therefore, in the operable range of sensorless control, the control unit MC efficiently decreases the number of rotations with necessary torque (current) under sensorless deceleration control, then transitions to synchronous deceleration control, and forcibly decreases the number of rotations under synchronous deceleration control.

With reference to FIG. 6, if the number of rotations at the time of the input of a stop command is equal to or less than the first number of rotations N1 and is greater than the second number of rotations N2, the control unit MC skips sensorless deceleration control (mode) without executing sensorless deceleration control since it is difficult to detect the position of the rotor M2, and executes synchronous deceleration control. When the number of rotations reaches the second number of rotations N2, then the control unit MC transitions to stop control, and stops the rotation of the rotor M2 (the compression mechanism P).

For example, the control unit MC determines a target current value (command current value) of synchronous deceleration control on the basis of a current value X1 of sensorless control immediately before a transition from sensorless control (motor drive control or sensorless deceleration control) to synchronous deceleration control. In other words, as described above, under sensorless control, the control unit MC stores, in the storage unit 6, the present current value of the motor M calculated by the current calculation unit 3 and the value of the present number of rotations (the present rotational speed value) of the rotor M2 calculated by the number-of-rotations calculation unit 5, and the stored current value and the stored value of the number of rotations (the stored rotational speed value) are updated. When transitioning from sensorless control (motor drive control or sensorless deceleration control) to synchronous deceleration control, then the control unit MC performs control that determines a target current value of synchronous deceleration control on the basis of the previous (latest) stored current value of sensorless control stored in the storage unit 6.

Specifically, for example, the control unit MC having the configuration of FIG. 4 reads the stored current value (the previous current value X1) in the storage unit 6 as the target current value of synchronous deceleration control, and provides the stored current value from the addition unit 8 to the voltage calculation unit 9. In other words, the control unit MC uses, for example, the previous current value X1 as it is without any corrections (100%) as the target current value of synchronous deceleration control. In this case, as indicated by solid lines in FIGS. 5 and 6, the phase current value is a constant value without any changes under synchronous deceleration control. Under a condition that a pressure difference between the pressure (Ps) in the suction pressure region and the pressure (Pd) in the discharge pressure region of the refrigerant is large, a decrease in the number of rotations makes it difficult to maintain the pressure difference state, and the discharge pressure (Pd) and the suction pressure (Ps) are becoming equal. However, a transition time to the achievement of a pressure equalization condition changes depending on factors (such as the volume of air hitting a capacitor unit, and the electromagnetic valve opening degree of an expansion valve) due to control in the vehicle air-conditioning system. If the target current value (command current value) is less than the previous current value X1, load torque acting on the motor M may exceed output torque from the motor M due to the pressure difference, and synchronous deceleration control may fail. In this case, under synchronous deceleration control, there is a possibility that troubles occur such as the rotor M2 does not respond and micro-vibration is generated, and the rotor M2 yields to load torque and stops. Therefore, in synchronous deceleration control, the control unit MC sets the target current value in such a manner that the target current value is not less than the previous current value X1.

In other words, the control unit MC may use a value (X1×120% in the drawing) obtained by incrementally correcting (100%+α %) the previous current value X1 as the target current value of synchronous deceleration control without using the linear current value X1 as it is as the target current value of synchronous deceleration control. In this case, the phase current value is a constant value greater than the previous current value X1 as indicated by dot-and-dash lines in FIGS. 5 and 6. In this manner, the target current value of synchronous deceleration control is set to be greater than the current value X1 of previous sensorless control, and therefore, stable synchronous deceleration control is achieved. In other words, even if the control unit MC is affected by disturbance due to the pressure condition or a refrigerant return state in the vehicle air-conditioning system, the motor M can respond sufficiently, and deceleration control based on stable synchronous control can be achieved. Note that if the target current value is set to be greater than the previous current value X1, the ratio (the value α) of the incremental correction is set in such a manner as to make the target current value less than an overload protection threshold of the motor M or less than a starting current at startup of the motor M. Consequently, a decrease in the life of an inverter component such as an IGBT and the occurrence of excessive loss are hindered.

In both the non-corrected case (the solid line of FIG. 5) and the corrected case (the dot-and-dash line of FIG. 5), the control unit MC fixes the target current value at a predetermined value equal to or greater than the previous current value X1 in synchronous deceleration control. However, the target current value is not limited to this. In other words, the control unit MC may change the target current value in synchronous deceleration control. In this case, the control unit MC determines a target current value for synchronous deceleration control on the basis of the pressure value Ps of the suction pressure region and the pressure value Pd of the discharge pressure region in the compression mechanism P during execution of synchronous deceleration control, and changes the determined target current value according to changes in the pressure values (Ps and Pd).

Specifically, in a state where there is a pressure difference between the suction pressure region and the discharge pressure region of the refrigerant, necessary torque required to rotate the motor M, and a target current value have been confirmed in advance for each pressure difference value by, for example, an experiment. In addition, for example, reference data (such as table data and map data) associated with the pressure difference value, the necessary torque, and the target current value is stored in advance in the storage unit 6. When transitioning to synchronous deceleration control, then the control unit MC extracts, from the reference data, a target current value corresponding to a present pressure difference value based on signals indicating the detected values of the pressure values (Ps and Pd) from the pressure sensors of the electric compressor 100 or on the vehicle side to determine the target current value. Since the pressure difference value decreases gradually under deceleration control, the control unit MC then changes the target current value according to a change (reduction) in the pressure difference during synchronous deceleration control. The control unit MC then provides the determined target current value from the addition unit 8 to the voltage calculation unit 9. The target current value is determined, for example, at every predetermined control period. Consequently, the target current value (command current value) of synchronous deceleration control is changed in such a manner as to decrease with decreasing pressure difference, and the phase current value decreases as indicated by chain double-dashed lines in FIGS. 5 and 6. As a result, in contrast to the control (in the cases of the solid line and the dot-and-dash line of FIG. 5) in which the target current value is fixed at a constant value, sufficient torque required to rotate the motor M is outputted. Therefore, unnecessary loads on the electric compressor 100 such as excessive motor heat generation and overheating of an IGBT are reduced, a decrease in power consumption is encouraged more effectively, and the life of an inverter component such as an IGBT is secured more reliably. Note that the target current value may be determined not by extraction from the reference data but by calculating the target current value at every predetermined control period on the basis of a regression formula indicating a relationship between the load torque (target current value) and the pressure difference of the electric compressor.

Moreover, the control unit MC also executes control that determines the value of a target number of rotations (also referred to as a speed command value or a target rotational speed value) under synchronous deceleration control. Specifically, the number-of-rotations setting unit 12 (refer to FIG. 4) of the control unit MC keeps providing the voltage calculation unit 9 with, for example, the value of a target number of rotations that reduces at predetermined (constant) deceleration preset and stored therein until the second number of rotations N2 that has been set to transition to stop control is reached.

Figure 7:
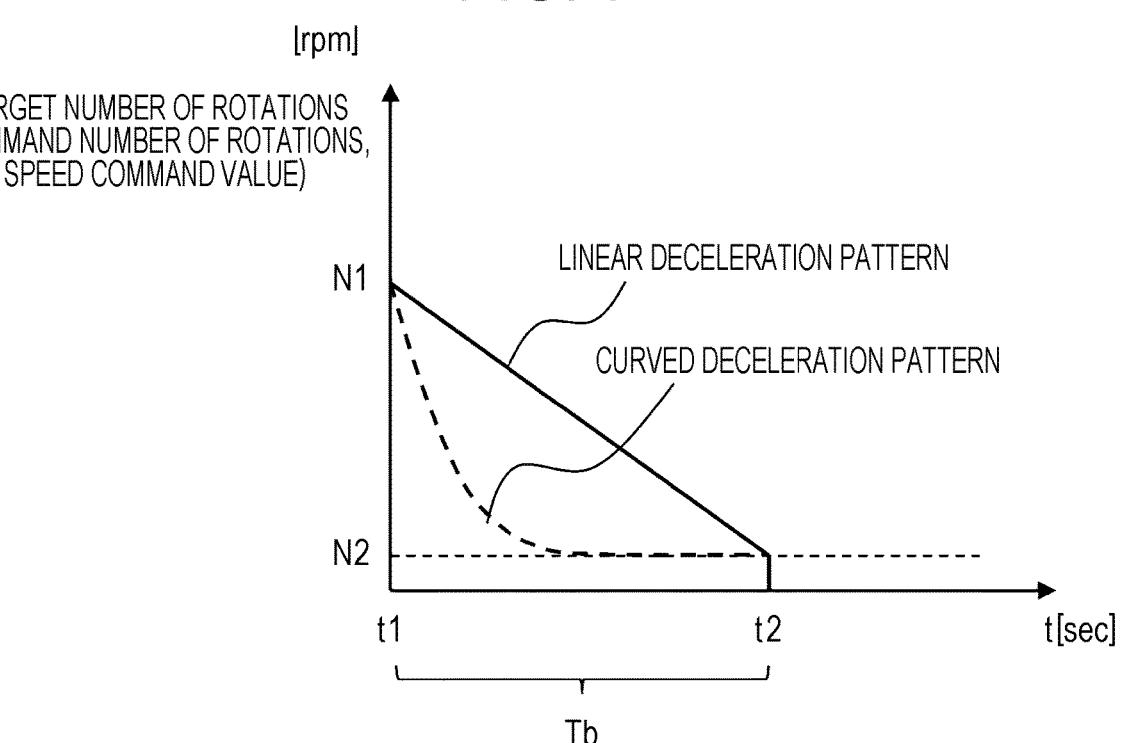
FIG. 7 is a conceptual diagram illustrating an example of changes in the value of a target number of rotations (a speed command value) under the synchronous deceleration control.

FIG. 7 is a conceptual diagram illustrating an example of changes in the value of the target number of rotations (the speed command value) under synchronous deceleration control. In synchronous deceleration control, for example, the control unit MC (the number-of-rotations setting unit 12) decreases the number of rotations (reduces speed) in a linear deceleration pattern in which deceleration is constant, as indicated by a solid line in FIG. 7. In other words, the number-of-rotations setting unit 12 keeps providing the voltage calculation unit 9 with the value of the target number of rotations (the speed command value) that decreases (reduces in speed) in the linear deceleration pattern having constant deceleration until the second number of rotations N2 is reached. Consequently, as illustrated in FIGS. 5 and 6, the number of rotations decreases at the constant deceleration from the first number of rotations N1 to the second number of rotations N2. Data related to deceleration is preset and stored in the storage unit 6.

However, the deceleration pattern is not limited to the linear deceleration pattern. For example, the control unit MC (the number-of-rotations setting unit 12) may decrease the number of rotations (reduce speed) in, for example, a curved deceleration pattern in which deceleration reduces gradually, as indicated by a broken line in FIG. 7, under synchronous deceleration control. Data of the gradually decreasing deceleration is preset and stored in the storage unit. In other words, linear constant deceleration or a speed command value of a first-order lag system is adopted as the value of the target number of rotations of synchronous deceleration control. With reference to FIG. 7, if a time Tb taken to end synchronous deceleration control (that is, the duration Tb of synchronous deceleration control) is the same, the number of rotations of the curved deceleration pattern (a broken line) reaches near the second number of rotations N2 earlier than that of the linear deceleration pattern (the solid line), and a low-speed operation state of the curved deceleration pattern continues longer than that of the linear deceleration pattern. Therefore, the adoption of the curved deceleration pattern allows encouraging mitigation of the reverse rotation phenomenon due to the pressure difference between the suction pressure region and the discharge pressure region, and the action of the electric compressor 100 itself due to the speed reduction and the action of reaction to the electric compressor 100, and as a result, a quieter stop is made.

If deceleration is constant, the time Tb taken to end synchronous deceleration control increases as the deceleration value decreases. If deceleration reduces gradually, the time Tb taken to end synchronous deceleration control increases as the initial amount of deceleration decreases. In the above example, the time Tb taken to end synchronous deceleration control is fixed at a predetermined value (time) determined by preset deceleration of the linear deceleration pattern or the curved deceleration pattern.

Here, if synchronous deceleration control ends in a short period of time in a state where the pressure difference between the pressure value Pd of the discharge pressure region and the pressure value Ps of the suction pressure region is relatively large, there is a possibility that the actions (behaviors) including reverse rotation and the generation of vibration at the time of a stop (after the second number of rotations N2 is reached) cannot be sufficiently suppressed. Therefore, it is preferable that the time Tb taken to end synchronous deceleration control increase, for example, as the pressure difference increases. In this respect, in the above-mentioned control example, the time Tb taken to end synchronous deceleration control is a fixed value, but is not limited to this, and may be configured in such a manner as to be changeable according to the pressure difference. In other words, the control unit MC may determine the time Tb taken to end synchronous deceleration control on the basis of the pressure value Ps of the suction pressure region and the pressure value Pd of the discharge pressure region in the compression mechanism P immediately before the transition from sensorless control to synchronous deceleration control.

Figure 8:
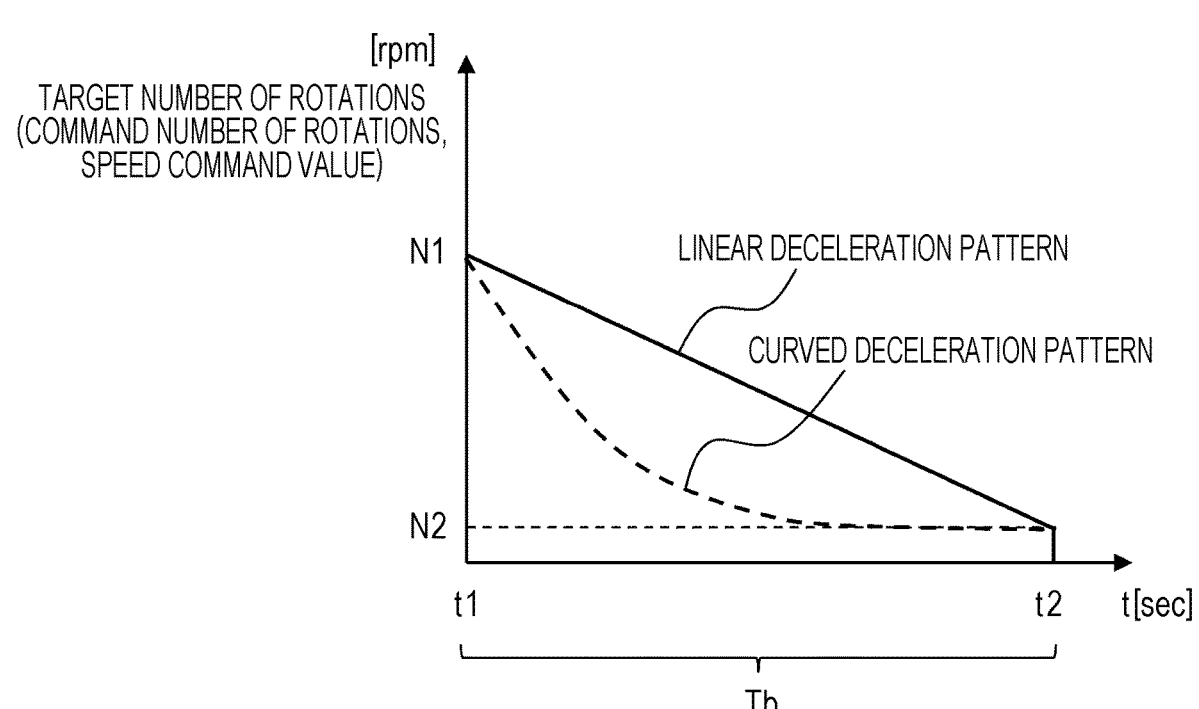
FIG. 8 is a conceptual diagram illustrating another example of changes in the value of the target number of rotations (the speed command value) under the synchronous deceleration control.

Specifically, in a state where there is a pressure difference between the suction pressure region and the discharge pressure region of the refrigerant, the optimum duration Tb of synchronous deceleration control has been confirmed in advance for each pressure difference value by, for example, an experiment. In addition, log data of the pressure difference value based on the pressure values (Ps and Pd) from the pressure sensors is stored in the storage unit 6. In addition, for example, reference data (such as table data and map data) associated with the pressure difference value and the duration is stored in advance in the storage unit 6. In addition, when transitioning to synchronous deceleration control, the control unit MC extracts a duration corresponding to the pressure difference value immediately before the transition from the reference data to determine the duration. Consequently, if the previous pressure difference value is relatively small (refer to FIG. 7), the duration Tb of synchronous deceleration control is shorter than in FIG. 8, which is an example of a case where the pressure difference is large, as illustrated in FIG. 7, and it is possible to hinder execution of unnecessary operation and quickly transition to stop control. If the previous pressure difference is relatively large (refer to FIG. 8), the duration Tb of synchronous deceleration control is longer than in FIG. 7, as illustrated in FIG. 8, and reverse rotation and the generation of vibration after the second number of rotations N2 is reached are reliably hindered.

Returning to FIGS. 5 and 6, when the number of rotations reaches the second number of rotations N2 under synchronous deceleration control described above, the control unit MC finally executes stop control.

Specifically, after driving all the IGBTs Q1 to Q6 to the off state, the control unit MC executes, as the braking control, for example, control that simultaneously brings all low-side elements or all high-side elements (the low-side element IGBTs (Q2, Q4, and Q6) in FIGS. 5 and 6) to an on state (also referred to as the Hi state). If the detected current value detected by the current detection unit 1 is greater than a predetermined first threshold under the braking control of the stop control, the control unit MC brings all the IGBTs Q1 to Q6 to the off state. Moreover, if the detected current value is less than the first threshold under the braking control, the control unit MC adjusts a drive pattern of the braking control-purpose elements in such a manner that the detected current value does not exceed a predetermined second threshold less than the first threshold. Although not particularly limited, the braking control-purpose elements as the predetermined switching elements targeted to adjust the drive pattern are all of the low-side element IGBTs (Q2, Q4, and Q6).

In the embodiment, the first threshold is set at a value less than a current value at which an IGBT may be damaged, and is set at, for example, a value corresponding to the value of an abnormal current that may occur when an overload occurs in the motor M. The second threshold is set at a peak value of a starting current that is generated at startup under the motor drive control. Since a current of the second threshold flows in the motor drive circuit PM at startup, IGBTs having resistance to the current of the second threshold are selected as the IGBTs Q1 to Q6. Moreover, the second threshold is greater than the value of rated current flowing in the motor drive circuit PM during the motor drive control after startup. In other words, a relationship of the first threshold>the second threshold>the rated current value holds.

The drive pattern of all the low-side element IGBTs (Q2, Q4, and Q6) of the braking control is adjusted by changing a duty cycle indicating the fraction of a predetermined period T in which all the low-side element IGBTs (Q2, Q4, and Q6) are in the on state, at every predetermined period. More specifically, at the start of the braking control, after setting all the low-side element IGBTs (Q2, Q4, and Q6) on the on state for a time period based on an initial duty cycle obtained by determining the duty cycle in advance, the control unit MC increases the duty cycle at a predetermined rate if the detected current value is less than the second threshold, and maintains the duty cycle or decreases the duty cycle at a predetermined rate if the detected current value is greater than the second threshold. Such an adjustment for the duty cycle is made at every predetermined period. The duty cycle reaches 100% in the end, and the braking force reaches its maximum. Even when the braking force reaches the maximum, inertial rotation may occur in a forward rotation state. Therefore, the control unit MC maintains this state for a predetermined period of time after the braking force reaches the maximum in order to reliably stop the inertial rotation. More specifically, although not particularly limited, the control unit MC executes, as the braking control, zero vector energization in which all the low-side element IGBTs (Q2, Q4, and Q6) are brought to the on state simultaneously and intermittently. In other words, the zero vector energization is not maintained throughout the braking control, but is terminated (switched to off) for a period (time) in accordance with the duty cycle at every predetermined period.

Next, a schematic flow of the overall control operation of the control unit MC is described. FIG. 9 is a flowchart for explaining a schematic flow of the control operation by the control unit MC.

When a stop command for the motor M is inputted into the control unit MC from the outside (the receipt of a motor stop command), the control unit MC starts control for stopping the rotation of the rotor M2 (STEP 1), and judges first whether or not the number of rotations of the rotor M2 at the time of the input of the stop command (at the time of receipt), that is, the present number of rotations of the rotor M2, is equal to or less than the first number of rotations N1 (STEP 2). Moreover, the control unit MC measures an elapsed time Tc since the stop command was inputted. If the number of rotations is greater than the first number of rotations N1 in STEP 2 (NO), the control unit MC transitions to sensorless deceleration control (STEP 3), and executes sensorless deceleration control, staying in sensorless control mode, until the number of rotations reaches the first number of rotations (STEP 2: YES). If the number of rotations is equal to or less than the first number of rotations N1 in STEP 2 (YES), the control unit MC judges whether or not the number of rotations is greater than the second number of rotations N2 (STEP 4). If the number of rotations is equal to or less than the second number of rotations N2 (NO), the control unit MC skips synchronous deceleration control, transitions to stop control, and starts stop control (STEP 8). On the other hand, if the number of rotations is greater than the second number of rotations N2 in STEP 4 (YES), the control unit MC transitions to synchronous deceleration control, and starts synchronous deceleration control (STEP 5). Under synchronous deceleration control, the control unit MC determines or changes the target current value and the value of the target number of rotations according to the above-mentioned control example (STEP 6). Under synchronous deceleration control, the control unit MC judges whether or not at least one of a condition 1 that the number of rotations is equal to or less than the second number of rotations N2 and a condition 2 that the elapsed time Tc since the stop command is equal to or greater than a preset predetermined elapsed time threshold Tc1 is satisfied (STEP 7). If at least one of the condition 1 and the condition 2 is not satisfied in STEP 7 (NO), in other words, if the number of rotations is greater than the second number of rotations N2 (the condition 1 is not satisfied) and the elapsed time Tc since the stop command is less than the elapsed time threshold Tc1 (the condition 2 is not satisfied), the control unit MC continues synchronous deceleration control. On the other hand, if at least one of the condition 1 and the condition 2 is satisfied in STEP 7 (YES), in other words, in any of a case where the number of rotations is equal to or less than the second number of rotations N2 (the condition 1 is satisfied), a case where the elapsed time Tc since the stop command is equal to or greater than the elapsed time threshold Tc1 (the condition 2 is satisfied), or a case where these conditions 1 and 2 are satisfied, the control unit MC transitions to stop control and executes stop control (STEP 8). The control unit MC measures the time elapsed since the transition to stop control, that is, the duration Td of stop control. The control unit MC then judges whether or not the duration Td of stop control is equal to or greater than a preset predetermined duration threshold Td1 (STEP 9). If the duration Td of stop control is less than the duration threshold Td1 in STEP 9 (NO), the control unit MC continues stop control. On the other hand, when the duration Td of stop control reaches the duration threshold Td1 (STEP 9: YES), a sufficient period of time has elapsed in the state having the maximum braking force, and therefore, the inertial rotation is reliably stopped. At this point in time, the control unit MC ends braking control, all the IGBTs Q1 to Q6 enter the off state, and the control unit MC ends stop control (STEP 10). Consequently, the control for stopping the rotation of the rotor M2 by the control unit MC ends (STEP 11).

In the electric compressor 100 according to the embodiment, the control unit MC executes synchronous deceleration control that is performed on conditions that a stop command for the motor M has been inputted from the outside and that the number of rotations of the rotor M2 is equal to or less than the predetermined first number of rotations N1 and is greater than the predetermined second number of rotations N2, and decreases the number of rotations under forced synchronous control based on a current having a predetermined target current value. Therefore, for example, even if the number of rotations of the rotor M2 is less than the minimum operable number of rotations for sensorless control, for example, at the time of the input of the stop command, the rotor M2 is caused to decrease in the number of rotations (reduce in speed) under synchronous deceleration control without the rotor M2 rotating by inertia, simply by presetting the first number of rotations N1 at a value that agrees with the minimum operable number of rotations for sensorless control. As a result, quietness upon stop of operation is improved more than before. Moreover, after the number of rotations reaches the second number of rotations N2 under synchronous deceleration control, the control unit MC stops the rotation of the rotor M2 under stop control. Consequently, the reverse rotation of the rotor M2 (the compression mechanism P) and abnormal noise caused by the reverse rotation can be quickly prevented or hindered. In this manner, the electric compressor 100 is provided which can improve quietness after the input of an operation stop command from the outside as compared with before. In other words, synchronous deceleration control causes the rotor M2 to reduce in speed to the low rpm range where it is difficult to estimate the position of the rotor M2 and speed cannot be reduced under sensorless control, and stop control prevents reverse rotation. Therefore, it is possible to provide a comfortable environment for the vehicle in its entirety by improving noise (NVH) at the time of a stop.

In the embodiment, if the number of rotations at the time of the input of a stop command is greater than the first number of rotations N1, the control unit MC executes sensorless deceleration control prior to synchronous deceleration control. Therefore, the control unit MC efficiently decreases the number of rotations with necessary torque (current) in the operable range of sensorless control under sensorless deceleration control, so that it is encouraged to keep power consumption in check.

In the embodiment, the second number of rotations N2, which is the number of rotations for the transition from synchronous deceleration control to stop control, is set at a value greater than the number of rotations corresponding to the resonance frequency of the vehicle part including the part of the vehicle to which the housing C of the electric compressor 100 is fixed. Consequently, under synchronous deceleration control, the electric compressor 100 can drive the motor M in the operating range (from the first number of rotations N1 to the second number of rotations N2) in which the number of rotations corresponding to the resonance frequency of the vehicle part (the bracket or frame of the vehicle) is avoided. The generation of vibration and noise in the low rpm range is hindered more reliably, and it is encouraged to construct a more comfortable environment for the vehicle in its entirety. Specifically, for example, if the second number of rotations N2 is zero, the number of rotations of the rotor M2 may pass through the number of rotations corresponding to the resonance frequency of the vehicle part during synchronous deceleration control. Therefore, low-frequency noise and vibration may be generated during synchronous deceleration control. In this respect, the electric compressor 100 of the embodiment is configured in such a manner as to operate in the operating range that avoids the number of rotations corresponding to the resonance frequency of the vehicle part.

Note that in the embodiment, the braking control-purpose elements as the predetermined switching elements targeted to adjust the drive pattern are all of the low-side element IGBTs (Q2, Q4, and Q6), but not limited to them, and may be all of the high-side element IGBTs (Q1, Q3, and Q5).

Moreover, in the embodiment, under stop control, the control unit MC is assumed to execute zero vector energization that simultaneously and intermittently brings all the low-side element IGBTs (Q2, Q4, and Q6), or all the high-side element IGBTs (Q1, Q3, and Q5), to the on state, but the embodiment is not limited to this. The control unit MC may, for example, (1) intermittently drive one of the high-side element IGBTs (Q1, Q3, and Q5) and one of the low-side element IGBTs (Q2, Q4, and Q6) to the on state, (2) intermittently drive two of the high-side element IGBTs (Q1, Q3, and Q5) and one of the low-side element IGBTs (Q2, Q4, and Q6) to the on state, or (3) intermittently drive one of the high-side element IGBTs (Q1, Q3, and Q5) and two of the low-side element IGBTs (Q2, Q4, and Q6) to the on state. Note that in these cases, IGBTs to be driven are determined in such a manner that a high-side and a low-side element of the same phase do not enter the on state simultaneously.

Up to this point the embodiment of the present invention and the modifications thereof have been described. However, the present invention is not limited to the above-mentioned embodiment and modifications, and naturally, can be modified or changed further on the basis of the technical idea of the present invention.

LIST OF REFERENCE SIGNS

B Direct current power supply
C Housing
IGBT (Q1 to Q6) Plurality of switching elements
M Motor
M2 Rotor
MC Control unit
N1 First number of rotations
N2 Second number of rotations
P Compression mechanism Pd Pressure value of suction pressure region Ps Pressure value of discharge pressure region PM Motor drive circuit

100 Electric Compressor

The invention claimed is:

1. An electric compressor comprising:

a compression mechanism configured to compress and discharge a refrigerant;

a motor configured to drive the compression mechanism;

a motor drive circuit connected between the motor and a direct current power supply, the motor drive circuit including a plurality of switching elements; and a control unit configured to control drive of the motor including sensorless control that increases or reduces the number of rotations of a rotor of the motor while estimating the position of the rotor on the basis of the current value of a current flowing from the motor drive circuit to the motor, wherein the control unit executes:

synchronous deceleration control that decreases the number of rotations of the rotor under forced synchronous control using a predetermined target current value of the current flowing from the motor drive circuit to the motor, on condition that, at the time of or after a stop command for the motor is inputted from an outside, the number of rotations of the rotor is equal to or less than a predetermined first number of rotations and is greater than a predetermined second number of rotations, wherein the first number of rotations is greater than zero, and the second number of rotations is greater than zero and less than the first number of rotations; and stop control that stops rotation of the rotor under braking control that controls drive of a predetermined switching element of the plurality of switching elements in such a manner as to apply a load to the motor, on condition that the number of rotations has reached the second number of rotations under the synchronous deceleration control.

2. The electric compressor according to claim 1, wherein upon the number of rotations at the time of the input of the stop command from the outside being greater than the first number of rotations, the control unit executes, prior to the synchronous deceleration control, sensorless deceleration control that decreases the number of rotations under the sensorless control until the number of rotations reaches the first number of rotations.

3. The electric compressor according to claim 1, comprising a housing that accommodates the compression mechanism, the motor, the drive circuit, and the control unit and is fixed to a vehicle, wherein the second number of rotations is set at a value greater than the number of rotations corresponding to a resonance frequency of a vehicle part including a part of the vehicle to which the housing is fixed.

4. The electric compressor according to claim 1, wherein the control unit determines the target current value of the synchronous deceleration control on the basis of the current value of the sensorless control immediately before a transition from the sensorless control to the synchronous deceleration control.

5. The electric compressor according to claim 1, wherein the control unit determines the target current value of the synchronous deceleration control on the basis of a pressure value of a suction pressure region and a pressure value of a discharge pressure region in the compression mechanism during the execution of the synchronous deceleration control, and changes the determined target current value according to changes in the pressure values.

6. The electric compressor according to claim 1, wherein the control unit decreases the number of rotations in a linear deceleration pattern in which deceleration is constant, or in a curved deceleration pattern in which deceleration reduces gradually, under the synchronous deceleration control.

7. The electric compressor according to claim 6, wherein the control unit determines a time taken to end the synchronous deceleration control, on the basis of the pressure value of the suction pressure region and the pressure value of the discharge pressure region in the compression mechanism immediately before the transition from the sensorless control to the synchronous deceleration control.

8. The electric compressor according to claim 1, wherein the first number of rotations is a minimum operable number of rotations for the sensorless control.

* * * * *